INVENTOR.
WILLIAM W. HANSEN

Patented Aug. 18, 1942

2,293,058

UNITED STATES PATENT OFFICE 2,293,058

BLIND LANDING ANTENNA ARRAY

William W. Hansen, Stanford University, Calif., assignor to Sperry Gyroscopic Company, Inc., Brooklyn, N. Y., a corporation of New York Application September 28, 1939, Serial No. 296,873

6 Claims. (Cl. 250—11)

Blind landing systems heretofore used generally employ suitable radio transmitting apparatus on the ground located on or near the landing field runway, and a receiver on the craft having means for indicating the strength of the received signal. This transmitting apparatus produces a curved glide path of uniform field strength and of parabolic form tangent with the runway and the pilot follows this path by manipulating the craft so that the received signal is of constant strength.

In actual use, it has been found that these curved glide paths, though usable, are difficult for the pilot to follow, the same necessitating constant altering of the airplane controls with the result that the craft is generally above or below the glide path, and if this is the case at the moment of contact with the ground, accidents are apt to result. Also, since the portion of the glide path that is tangent to the runway is of considerable extent, the craft, when flying to a landing, must just skim over the ground for a long distance before landing and this is apt to lead to accidents due to the striking of obstructions in advance of the runway.

The principal object of the present invention is to provide a novel blind landing antenna array adapted to produce a substantially straight glide path, the elevation angle of the glide path being predetermined to obtain an optimum rate of descent, thereby enabling the pilot to descend and land under the most favorable conditions of operation.

Another object of the present invention lies in the provision of a novel blind landing antenna array that produces a signal zone having substantially the shape of an inverted conical surface, whereby aircraft may use the array in landing from any direction whatsoever.

Still another object of the present invention is to provide a novel blind landing antenna array that is so constructed and arranged that the same may be placed at any desired point in a landing field without interfering with aircraft running thereover.

A further object of the present invention lies in the provision of an antenna array that will produce a substantially straight glide path when using high frequency waves and even when using waves of approximately one or two meters, any noticeable curve in the glide path being immediately adjacent the array, thereby slowing the rate of descent immediately before landing, which is desirable.

Other objects and advantages will become apparent from the specification, taken in connection with the accompanying drawings wherein the invention is embodied in concrete form.

In the drawings.

Similar characters of reference are used in all of the above figures to indicate corresponding parts.

Figure 1:
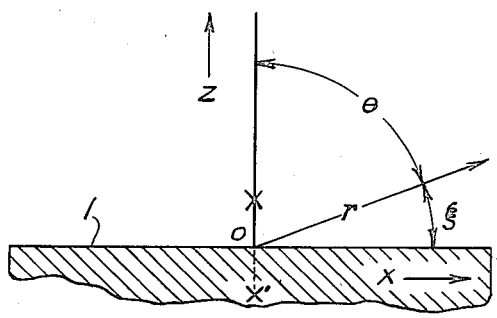
Fig. 1 is a schematic sectional view for illustrating the operation of a typical array heretofore used, and also shows the symbols used in the mathematical discussion.

Referring now to Fig. 1, illustrating the operation of arrays now generally used, the reference numeral 1 designates a portion of runway shown in cross section. Assuming this runway as a base line, polar coordinates $r$ and $\theta$ are illustrated for the purpose of specifying the position of an airplane. Obviously, if desired, coordinates $x$ and $z$ could be used. However, the angle $\theta$ is usually the most useful in the mathematical treatment. In our consideration, the angle $\theta$ is generally near 90° since the angle of glide is small, and hence in the description herein, the complementary angle $\zeta$ will often be used, i. e., $\zeta$ equals the angle of elevation of any point having a radius $r$.

The commonly used glide path antenna array consists of a single horizontal radiator oriented generally in the $y$ direction, i. e., at right angles to the plane of Fig. 1, and placed somewhat above the origin indicated at 0, at the point $x$, for example.

Assuming the ground to be a perfect conductor for purposes of simplicity, it is well known that the antenna and ground together can be replaced by a hypothetical system consisting of the original antenna and an image thereof but with no ground. This image antenna will be a duplicate of the actual antenna and will be located as far below the origin 0, i. e., at $x'$, as the actual antenna is above 0. However, the currents in the antenna and its image will be in opposite directions. Thus, it will appear that the electric field at some point $r, \zeta$ will be equal in magnitude to the field at the point $r, -\zeta$, but the fields will be in opposite directions or, expressing the same idea mathematically, the electric field E is a function of $r$ and such that $E(r, \zeta) = -E(r, -\zeta)$. Now, if this function is expanded in a power series about the point $\zeta=0$, the above equation can be satisfied only if the series contains no terms in even powers of $\zeta$. Thus, only odd powers of $\zeta$, i. e., $\zeta$, $\zeta^3$, $\zeta^5$ can appear and for sufficiently small values of $\zeta$ we can neglect all but the term in $\zeta$. Moreover, when it is remembered that the electric field is always proportional to $1/r$, it will be seen that for small values of $\zeta$, E must have the following form:

(1) $\qquad E = \text{constant times } \zeta/r$

An exact analysis, not given here, will lead to the above result.

In determining the form of the glide path the above described antenna will produce, it is convenient to use the coordinates $x$ and $z$ instead of polar coordinates. To determine E expressed in terms of $x$ and $z$, it will be noted that for small values of $\zeta$, with which we are most concerned, $\zeta \approx z/x$ and $r \approx x$. Thus, the following is true:

(2) $\qquad E = \text{constant times } z/x^2$

The glide path is determined by holding the field strength E constant so that the equation of the glide path is given by (3) $\qquad z/x^2 = \text{constant}$ or (4) $\qquad z = \text{constant times } x^2$ so that the glide path is a parabola.

It will be observed that if it were possible to make E depend on a higher power of $\zeta$ than the first, the resulting glide path would be more nearly straight. To see how this works out, in general, it will be assumed that it is possible to devise an array which gives $E = \text{constant times } \zeta^p/r$. Then by exactly the same procedure as given above, it will be found that the equation describing the glide path is (5) $\qquad z = \text{constant times } x^{\frac{p+1}{p}}$ where $p$ will have values as given below.

Figure 2:
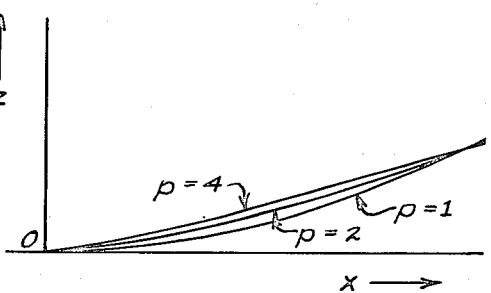
Fig. 2 illustrates several constant signal intensity glide paths which would be obtained if the radiation field strength E varies as an exponential function, i. e. with some power, of the angle with the ground, i. e. $\zeta^p$, in which $p$ has values 1, 2 and 4. When $p=1$, the well known parabolic glide path is obtained.

It will be found that even slight increases in $p$ result in marked straightening of the glide path. For example, arrays in accordance with this invention have been devised which will give values of $p$ equal to 2 or 4. Fig. 2 shows glide paths resulting from using $p$ having values of 1, 2 and 4. From observing this figure, it will be noted that it is possible to obtain a path that is substantially straight except for the region immediately adjacent the origin 0, where the glide path has a slight upward curvature. Such curvature at this point is not objectionable and may even be desirable when thus confined to the end of the glide path, as in this case, for it serves as a signal to the pilot that contact with the ground is about to occur.

The novel arrays of this invention, producing this type of glide path, employ vertically polarized radiators, i. e., those producing electromagnetic waves having the electric vector vertical instead of having the electric vector horizontal, as in the array of the type shown in Fig. 1.

Figure 3:
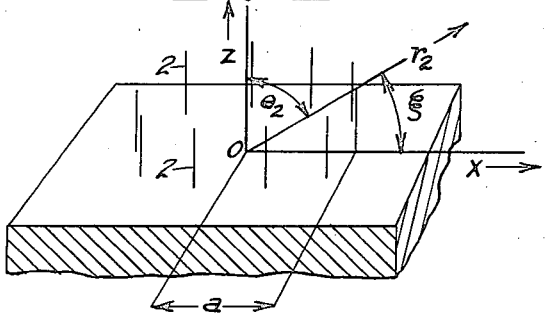
Fig. 3 is a fragmentary perspective view used for explaining the invention.

Referring now to Fig. 3, there is shown a series of vertical radiators 2 arranged in a circle of radius $a$, which circle may be assumed to be centered at the origin 0. The radiators 2 may be located at any desired point in the landing field, and since radiation from this array is of inverted conical form, aircraft may approach from any direction and make a landing on the field. These radiators 2 may be light vertical rods carried by rubber base mountings so that an airplane may run directly thereover, momentarily flattening the array without in any way interfering with the operation of the airplane. In other words, this array may be placed directly on the runway without injury thereto or to the airplanes using the field.

In the mathematical analysis of this array, the ground, as above described, may be replaced by an image of the antenna. However, there is one important difference, i. e. whereas before the current in the image was in a direction opposite to that in the antenna, in the present instance it will be in the same direction. As a consequence, E (at vectors $r$, $\zeta$) and E (at vectors $r-\zeta$) will now be equal both in magnitude and sign. From this it follows that the power series expansion of E contains only even powers. Thus, E is written in the form:

(6) $\qquad E = \text{constant } x \frac{1}{r}(a_0 + a_2\zeta^2 + a_4\zeta^4 \ldots )$ where $a_0$, $a_2$, etc., are at present unknown.

Such a radiation pattern is, in general, of no use for our present purpose because the term $a_0$ gives a non-vanishing field at $\zeta=0$, i. e., at the ground. On the other hand, if it were possible to make $a_0$ vanish, we would then have E varying like $\zeta^2$, which, as we have seen, leads to a desirable glide path. It will now be shown that by a suitable choice of the radius $a$, this result is possible.

It is necessary first to find a quantitative expression for the field strength in terms of $r_2$, $\theta_2$, $a$, and any other quantities that may be needed. It will be found, however, that it is simpler in all respects to compute first an auxiliary quantity denoted by A and commonly called the vector potential. In general, E can be computed from A by performing various differentiations, but in the present case it is well known that the same effect can be obtained by simply multiplying by $\sin \theta_2$. For the present it is only necessary to note that near the point where $\theta_2 = \pi/2$, $\sin \theta_2$ is nearly constant and the angle dependence of A and E is practically identical.

To compute A, it is shown in standard texts on electromagnetism that if all quantities depend sinusoidally on the time and one takes this time dependence as given by a factor $e^{-i\omega t}$, then Maxwell's equation becomes (7) $\qquad \nabla \cdot E = 4\pi\rho \qquad \nabla \cdot B = 0$ $\qquad \nabla \times E = ikB \qquad \nabla \times B = -ikE + \frac{4\pi}{c}i$ In the above, E and B are the electric and magnetic fields, respectively, $\rho$ is the charge density and $i$ is the current density. The units are Gaussian, $k = \omega/c$ where $\omega = 2\pi$ times the frequency and $c$ is the velocity of light. The dielectric constant and permeability have been taken as unity and $i = \sqrt{-1}$.

The solution of the equations is much simplified by the introduction of the quantities A and $\phi$, called the vector and scalar potentials and defined by (8) $\qquad \begin{aligned} E &= ikA - \nabla\phi \\ B &= \nabla \times A \\ \nabla \cdot A &- ik\phi = 0 \end{aligned}$ The quantities A and $\phi$ are found to be determined by the equations (9) $\qquad \nabla^2 A + k^2 A = -\frac{4\pi}{c}i$ $\qquad \nabla^2 \phi + k^2 \phi = -4\pi\rho$ On solving these, it is found that

(10) $\qquad A(2) = \frac{1}{c}\int \frac{e^{ikr_{12}}}{r_{12}} i(1) d\tau$ $\qquad \phi(2) = \int \frac{e^{ikr_{12}}}{r_{12}} \rho(1) d\tau$ where $r_{12}$ is the distance between the point 2, where the value of A is desired, and point 1 where the volume element $d\tau$ contains a current (1). It is not necessary to compute $\phi$ since it can be obtained directly from A by the use of the third equation of (8).

To proceed with the calculation, it is necessary to find a suitable form for $$\frac{e^{ikr_{12}}}{r_{12}}$$

in terms of $r_1$, $\theta_1$, $\phi_1$, the spherical coordinates of a current element, and $r_2$, $\theta_2$, $\phi_2$, the coordinates of a point at which it is desired to compute A and so, eventually, the fields.

A suitable expansion is the following:

(11) $\frac{e^{ikr_{12}}}{r_{12}} = \frac{i}{kr_1 r_2} \Sigma_l \Sigma_m (2l+1) \frac{(l-m)!}{(l+m)!} \eta_l(kr_2) \psi_l(kr_1) P_l^m(\theta_1) P_l^m(\theta_2) e^{im(\phi_1-\phi_2)}$ where the various symbols have the following meanings:

The functions $P_l^m$ are known as spherical harmonics and are essentially combinations of sines and cosines, as follows:

(12) $P_l^m(\theta) =$ $\frac{(l+m)!}{2^m m!(l-m)!} \sin^m\theta \left[ \frac{1-(l-m)(l+m+1)}{1(m+1)} \frac{1-\cos\theta}{2} + \frac{(l-m)(l-m-1)(l+m+1)(l+m+2)}{1\cdot 2(m+1)(m+2)} \left(\frac{1-\cos\theta}{2}\right)^2 \cdots \right]$ Since $l$ and $m$ are integers, this series always terminates.

The functions $\eta$ and $\psi$ are also built up from sine and cosine functions.

(13) $\eta_l(kr_2) = (-i)^{n+1} e^{ikr_2} \left[ 1 + \frac{i}{2kr_2} \frac{l(l+1)}{1!} + \left(\frac{i}{2kr_2}\right)^2 \frac{(l-1)l(l+1)(l+2)}{2!} \cdots \right]$

(14) $\psi_l(kr_1) = P(kr_1) \sin\left(kr_1 - l\frac{\pi}{2}\right) + Q(kr_1) \cos\left(kr_1 - l\frac{\pi}{2}\right)$ with

(15) $P(kr_1) = 1 - \frac{(l-1)l(l+1)(l+2)}{2!}\left(\frac{1}{2kr_1}\right)^2 \cdots$ $Q(kr_1) = l(l+1)\left(\frac{1}{2kr_1}\right) - \frac{(l-2)(l-1)l(l+1)(l+2)(l+3)}{3!}\left(\frac{1}{2kr_1}\right)^3 \cdots$ Here again the series always terminate, so that all the functions appearing in Equation 11 can be expressed using a finite number of sines and cosines.

Now it is necessary to specify the current distribution. For this $i$ is taken to be zero except in a thin ring at $r_1=a$, $\theta_1=\pi/2$ of radial thickness $\Delta r_1$ and height $\Delta z$. Inside of this ring the current will be in the $z$ direction, i. e., vertical, will vary as $e^{jm^1\phi_1}$ and have absolute magnitude such that $|i\Delta r_1\Delta z/c|=1$. Here $m'$ is a specific integer including zero which represents the number of complete cycles of phase progression of the current encountered in going around the array once. Thus, $m'$ determines how rapidly the current phase changes with respect to azimuth.

This current distribution is now multiplied by 11) and the product integrated, as indicated in 10). The result can be put in quite simple form, as follows. First, because of the choice of current distribution the summation over $m$ in 11) is replaced by a single term, since every term wherein $m$ differs from $m'$ vanishes. Next, the quantities $r_1$ and $\theta_1$ become simply $a$ and $\pi/2$. Thus the result can be written as a function of three variables $r_2$, $\theta_2$, and $a$. Moreover, if $\lambda \ll r_2$, as it will be taken to be, it is possible to approximate $\eta^l(kr_2)$ by the first term of (13) so that the $r_2$ dependence can be factored and put outside the summation sign. Finally a closed formula for $$P_l^m(\theta=\pi/2)$$

is known; it is

(16) $P_l^m\left(\theta=\frac{\pi}{2}\right) = \frac{(l+m)!}{2^l\left(\frac{l-m}{2}\right)!\left(\frac{l+m}{2}\right)!}(i)^{(l-m)}$ when $l-m$ is even and $P_l^m(\theta=\pi/2)=0$ when $l-m$ is odd.

Making all these simplifications it is found that

(17) $A_z = \frac{\lambda}{i^{m'}} \frac{e^{ikr_2}}{r_2} e^{im'\phi_2}$ $\sum \frac{(2l+1)(l-m')!}{2^l\left(\frac{l-m'}{2}\right)!\left(\frac{l+m'}{2}\right)!} \psi^l(ka) P_l^{m'}(\theta_2)$ Here $A_z$ is the $z$ component of A, the others being zero, and the summation is over all values of $l$ equal to or greater than $m'$ and such that $(l-m')$ is even, i. e., $l=m'$, $m'+2$, $m'+4$ ......

It can be shown that E is substantially equal to $A_z \sin\theta_2$. Thus, from Equation 17

$$A = K_z \frac{e^{ikr_2}}{r_2} e^{im'\phi_2} f(\theta_2)$$

Here $K_z$ is a unit vector in the $z$ direction, and $f(\theta_2)$ is a function of $\theta_2$ which is actually given by (17) but about which, for present purposes, we need know nothing.

Writing this in polar components we have $$A = \left(\frac{e^{ikr_2}}{r_2} e^{im'\phi_2} f(\theta_2)\right)(K_r \cos\theta_2 - K_\theta \sin\theta_2)$$

where $K_r$ and $K_\theta$, are unit vectors in the $r$ and $\theta$ directions.

Now, as shown by (8), the field B is given by:

$B = \nabla \times A = K_r\left[\frac{-1}{r_2 \sin\theta_2} \frac{\partial}{\partial \phi_2} A_\theta\right] + K_\theta\left[\frac{1}{r_2 \sin\theta_2} \frac{\partial A_r}{\partial \phi_2}\right] + K_\phi\left[\frac{1}{r_2} \frac{\partial}{\partial r_2}(r_2 A_\theta) - \frac{1}{r_2} \frac{\partial A_r}{\partial \theta_2}\right]$ where $A_\theta$ and $A_r$ represent the $\theta$ and $r$ components of A.

The second expression is obtained by looking up the components of the operator $\nabla \times$, as for example in "Smithsonian Mathematical Formulae," E. P. Adams, Smithsonian Institution, 1922, page 102.

On performing the indicated operations, we find $B = +K_r \frac{e^{ikr_2}}{r_2^2} jm' e^{im'\phi_2} f(\theta_2) +$ $K_\theta \frac{e^{ikr_2}}{r_2^2} \frac{jm' \cos\theta_2}{\sin\theta_2} e^{im'\phi_2} f(\theta_2) -$ $K_\phi \left[\frac{jk e^{ikr_2}}{r_2} \sin\theta_2 e^{im'\phi_2} f(\theta_2) - \frac{e^{ikr_2}}{r_2^2} e^{im'\phi_2} \text{ times}\right.$ $\left. \left(\cos\theta_2 \frac{\partial f}{\partial \theta_2} - \sin\theta_2 f\right)\right]$ Now the first, second, and fourth of these vary like $1/r_2^2$; the third like $1/r_2$. Therefore, at sufficiently large distances, only the third term is important, and we have $$B \cong -K_\phi \frac{jke^{ikr_2}}{r_2} e^{im'\phi_2} \sin\theta_2 f(\theta_2)$$

Now by (7) we have, in free space where $i=0$, $$\nabla \times B = -jkE$$

$$E = -\frac{j}{k} \nabla \times B$$

We now perform the operation $\nabla \times$ on B and find, as before, that some terms involve $1/r_2^2$, others $1/r_2$. Saving only the latter we get $$\nabla \times B = K_\theta \frac{(jk)^2 e^{ikr_2}}{r_2} e^{im'\phi_2} \sin\theta_2 f(\theta_2)$$

$$E = -K_\theta \frac{jke^{ikr_2}}{r_2} e^{im'\phi_2} \sin\theta_2 f(\theta_2)$$

This justifies the assertion that E is essentially $\sin\theta_2$ times A.

It might have been more exact to say that the $\theta$ component of E, which is the only important one at large distances, is just $jk \sin\theta_2$ times the $z$ component of A.

Figure 4:
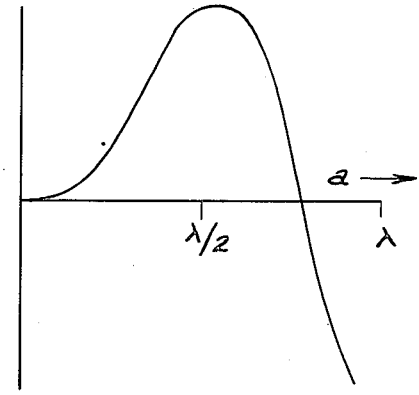
Figs. 4 and 5 are graphs illustrating the principles of the invention.

Now, according to the foregoing, if it is possible to find a value of $a$ such that $A_z$ $(r_2, \theta_2 = \pi/2, a) = 0$, then for this value of $a$, $A_z$ and hence E will be a quadratic function of $\theta_2 - \pi/2$ near $\theta_2 = \pi/2$. To find such a value of $a$, compute (17) as a function of $a$ for $\theta = \pi/2$ and plot it. An example of such a plot is given in Fig. 4, where $A_z$ for $\theta_2 = \pi/2$ and fixed $r_2$ is plotted as a function of $a$ for the case $m = 2$. It will be seen that there is a zero at $a = .817\lambda$.

Figure 5:
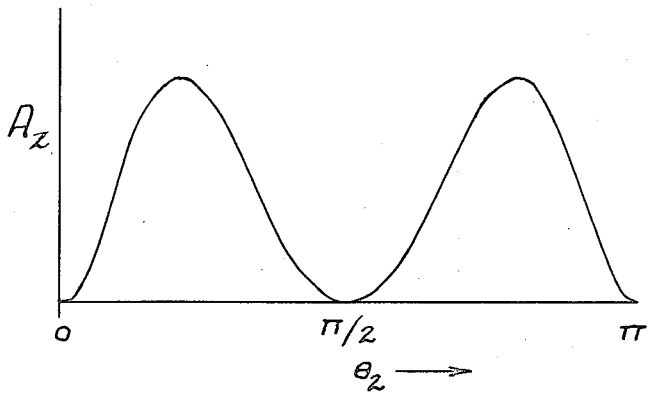

Now, according to the symmetry arguments above, taking $a = .817\lambda$ and plotting $A_z$ against $\theta_2$, the resulting graph should be parabolic near $\theta_2 = \pi/2$. That this is actually true may be verified by looking at Fig. 5 where $A_z$ is plotted for constant $r_2$ and $a = .817\lambda$ against $\theta_2$.

Thus, the quantitative predictions are verified, and it is found that proper choice of $a$ will lead to a directional pattern suitable for blind landing. As to exactly what values of $a$ are suitable, all values of $m'$ have been examined up to $m'=5$ inclusive and all values of $a$ up to about $1.5\lambda$ and there is given in the table below values of $a/\lambda$ in this range that give the above described desirable radiation pattern. Further values can be found, if desired, by calculations made in the manner described above.

Table I

| $m'$ | $a/\lambda$ | | |
|---|---|---|---|
| 0 | .383 | .877 | 1.377 |
| 1 | .610 | 1.115 | 1.620 |
| 2 | .817 | 1.340 | |
| 3 | 1.016 | 1.553 | |
| 4 | 1.208 | | |
| 5 | 1.399 | | |

It will now be shown how the above assumed continuous current distribution is to be approximated in practice. First, as to vertical height, it is well known that any vertical wire of height less than $\lambda/4$ acts almost like an infinitesimal dipole. As to how many such vertical radiators will be needed on the circumference of the circle of radius $a$ it is difficult to give a simple, exact answer for the minimum number, but it is known that the number must exceed $ka+m'$. Just how much excess is needed is hard to determine in general and it is probably not worth a great deal of trouble to find out because, in the present application, the antennae will be so small that their cost will be inconsequenti: Moreover, reliability and simplicity of the ci cuits giving the correct phase of current to t: various elements will be a matter of considerab importance and this problem will be greatly sir plified if the number of antennae is an integr multiple of $m'$, say $2m'$ or $3m'$, in which ca one would need respectively only two or thr different phases of current.

Thus, one type of array suitable for blind lan ing purposes in accordance with this inventic consists of a ring of vertical radiators, of heig! $\lambda/4$ or less, the radius of the ring to be one the values given in Table I above. The numb of radiators will exceed $ka+m'$ and, for conver ience will be some integral multiple of $m'$. A the radiators will carry currents of equal may nitudes but the phase of the current going fro radiator to radiator around the ring will chan; progressively at such a rate that, on going con pletely around the ring, the phase will chan; by 360 times $m'$ in electrical degrees.

Figure 6:
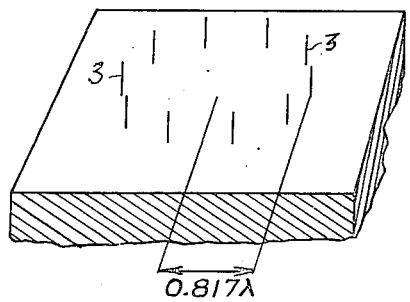
Figs. 6 and 8 show typical antenna arrays embodying the principles of the present invention.

Fig. 6 illustrates a typical array and shows te vertical radiators 3 that are $\lambda/4$ high on a ci: cle of radius $a = .817\lambda$. The currents in the ar tenna elements are equal in magnitude but pro gress steadily in phase by an amount 72° po antenna. In this case, $m' = 2$.

The type of array just described leads to glide path of the form $z = $ constant times $x^3$ which is much straighter than the convention: parabolic path. In many cases this will be satis factory, but in some cases an even straighte path may be desired and it will now be show how, by an extension of the above methods, th can be obtained.

Figure 7:
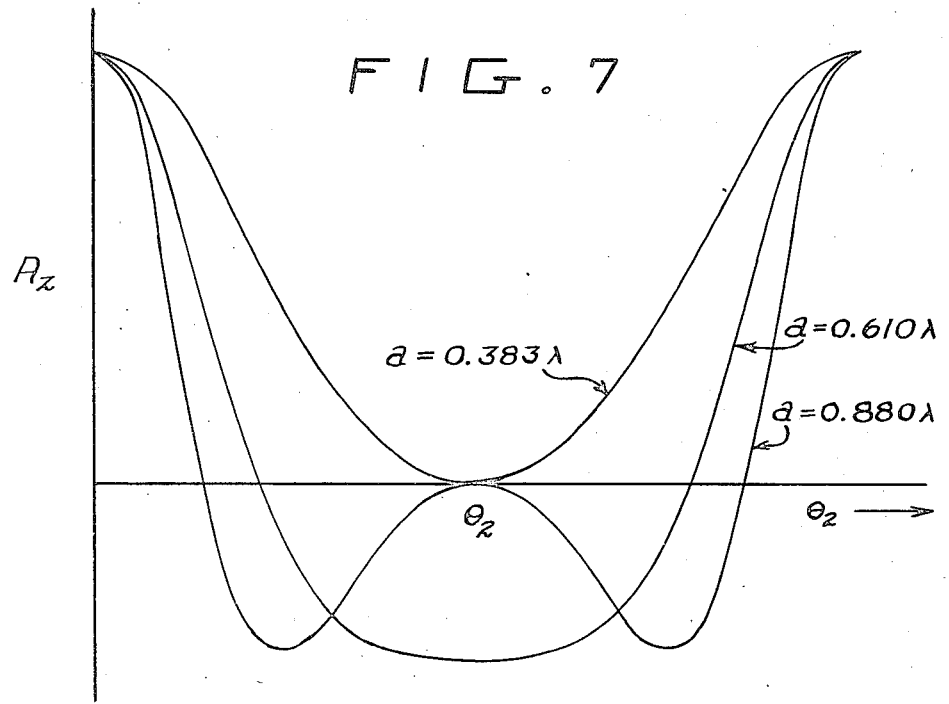
Fig. 7 is an explanatory graph.

To see how this is done, consider Fig. wherein there is plotted $A_z$ for $m = 0$ against for the lowest values of $a$ taken from Table It will be observed that, at $\theta_2 = \pi/2$ one of thes has a positive second derivative, the other negative. Thus one would expect that, for som intermediate value of $a$, there would be a curv which had zero second derivative at $\theta_2 = \pi/2$ This is in fact so: for $a = .610$ the curve is of th fourth order in $\theta_2 - \pi/2$ near $\theta = \pi/2$. This curv is plotted also in Fig. 7.

The manner of determining the value of used above will now be explained and also ho others may be found likewise. In principle i could of course be done by plotting curves A against $\theta_2$ for various values of $ka$ and findin in this way when the second derivative change sign, but in practice this would be both tediou and inaccurate and it is from all points of viev preferable to do part of the work analytically.

There is no trouble in doing this for it is known that the functions $P^m_l$ satisfy the following dif ferential equation.

$$(18) \quad \frac{d^2 P^m_l}{d\theta^2} + \frac{\cos\theta}{\sin\theta} \frac{dP^m_l}{d\theta} + \left[l(l+1) - \frac{m^2}{\sin^2\theta}\right] P^m_l = 0$$

and from this one can find the value of $d^2P/d\theta$ at $\theta_2 = \pi/2$. The result is $d^2P/d\theta^2 = l(l+1) - m^2$ Then, when putting this in (17) one finds $$(19) \quad \frac{\partial^2 A_z(r_2, \theta_2 = \pi/2, a)}{\partial \theta^2} = \frac{\lambda}{i^{m'}} \frac{e^{ikr_2}}{r_2} e^{im'\phi_2}$$

$$\sum \frac{(2l+1)(l-m')!(l+m')!(m^2-l)(l+1)\psi'(ka)}{2^{2l}\left[\left(\frac{l-m'}{2}\right)!\left(\frac{l+m'}{2}\right)!\right]^2}$$

In this way the second derivative is determinec directly as a function of $ka$ and by plotting one can easily find the value of $ka$ which gives zerc second derivative. It is in this way that the value $a=.610\lambda$ used above was determined. Now a radiation pattern like that of Fig. 7, $a=.610\lambda$ is of course useless for blind landing because it has finite intensity at the ground, but if it is borne in mind that a simple dipole at the origin gives $A_z$ independent of $\theta_2$, i. e., a straight line on a graph like Fig. 7, it will be seen how a useful result can be obtained. Namely, by adding to the ring at $a=.610\lambda$ a dipole at the origin of such strength and phase that at $\theta_2=\pi/2$, the fields due to the dipole and the ring just cancel. Then the total field will be proportional to $(\theta_2-\pi/2)^4$ near $\theta_2=\pi/2$ and this will lead to a glide path of the form $z=$constant times $x^{5/4}$ and this is very straight indeed.

Although the same general principle can be applied to other cases than $m^1=0$, it seems almost certain that these will all give arrays too complex and difficult to keep in adjustment to be of use in practice. It is therefore preferable, in the case of arrays of the above type, to limit consideration to the single value $m'=0$. Appropriate values of $a$ for this case have been worked out, the first of these being $a=.610\lambda$, $1.116\lambda$, $1.616\lambda$, $2.120\lambda$. Higher possible values of $a$ can, if need be, be computed as explained above.

Figure 8:
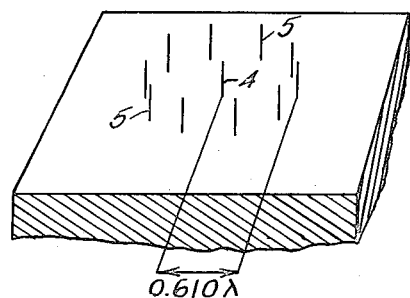

This form of the invention is illustrated in Fig. 8, wherein an array is shown consisting of a central radiator 4 surrounded by a ring of radiators 5 at radius $a=.610\lambda$, $1.16\lambda$, $1.616\lambda$, $2.120\lambda$, etc., all these radiators to be vertical and about $\lambda/4$ high. The radiators in the ring are excited with equal currents, all in the same phase. The central radiator is supplied with current either in phase or 180° out of phase with that in the ring and of magnitude such that the field at the ground vanishes. The current in the central antenna and the currents in the ring will be in phase if $a=.610\lambda$, $1.616\lambda$, $2.62\lambda$ etc. and 180° out of phase if $a=1.116\lambda$, $2.120\lambda$, etc.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A blind landing antenna array comprising a plurality of mutually spaced vertical antennae arranged in a circle, means exciting said antennae with currents of equal amplitude and progressively varying phase, and means for causing the field strength of the radiated energy substantially to vanish at the surface of the ground, said last-named means including means for adjusting the phase and wave-length of the energization of said antennae.

2. A blind landing antenna array providing a glide path of substantially constant field strength having substantially the form of an inverted conical surface, said array comprising a plurality of vertical radiators of a height not greater than one fourth the operating wave length, said radiators being disposed in a circle having a radius equal to approximately eight tenths of such wave length, said radiators being excited at progressively shifting phase on going around the circle to cause the field strength of the radiated energy substantially to vanish at the earth's surface.

3. A blind landing antenna array providing a glide path having substantially the form of an inverted conical surface, said array comprising a plurality of vertical radiators of a height not greater than one fourth the operating wave length, said radiators being disposed in a circle having a radius equal to approximately eight tenths of such wave length, said successive radiators in going around the circle being excited at progressively different phases, the rate of phase rotation being 720 electrical degrees in going once around the circle.

4. A blind landing antennae array comprising a plurality of mutually spaced vertical antennae arranged in a circle and excited so that said antennae all carry equal currents, but at progressively shifting phase in going around the circle, the radius of said circle with relation to the wavelength radiated by said antennae being of such value that $A_z$ of the equation $$A_z = \frac{\lambda}{j^{m'}} \frac{e^{ikr_2}}{r_2} e^{im'\phi_2} \sum_l \frac{(2l+1)(l-m')!}{2\left(\frac{l-m'}{2}\right)!\left(\frac{l-m'}{2}\right)!} \psi_l(ka) P^{m'}_l(\theta_2)$$

equals zero, $\lambda$ being the operating wave length; $k$ being $2\pi/\lambda$; $m'$ being the rate of change of current phase with respect to azimuth; $a$ being the radius of the circle; $r_2$, $\phi_2$, $\theta_2$ being the spherical coordinates of the receiving point; $l$ being a summation index; $\psi_l(ka)$ being the function:

$$P(ka)\sin(ka-l\pi/2)+Q(ka)\cos(ka-l\pi/2)$$

where $$P(ka)=1-\frac{(l-1)l(l+1)(l+2)}{2!}\left(\frac{1}{2ka}\right)^2\ldots$$

$$Q(ka)=l(l+1)\left(\frac{1}{2ka}\right)-\frac{(l-2)(l-1)(l)(l+1)(l+2)(l+3)}{3!(2ka)^3}$$

and $$P^{m'}(\theta_2)=\frac{(l+m')!}{2^{m'}(m')!(l-m')!}\sin^{m'}\theta$$

$$\left[1\frac{-(l-m')(l+m'+1)}{1(m'+1)}\frac{1-\cos\theta}{2}+\right.$$

$$\frac{(l-m')(l-m'-1)(l+m'+1)(l+m'+2)}{1.2(m'+1)(m'+2)}$$

$$\left.\left(\frac{1-\cos\theta}{2}\right)^2+\right]\ldots$$

5. A blind landing antennae array comprising a plurality of mutually spaced vertical antennae arranged in a circle having a radius equal to a fractional part of the wavelength of the energy radiated by said antennae, such fractional part comprising one of the following values, i. e., $.383\lambda$, $.610\lambda$, $.817\lambda$, $1.016\lambda$, $1.208\lambda$, $1.399\lambda$, $.877\lambda$, $1.115\lambda$, $1.340\lambda$, $1.553\lambda$, $1.377\lambda$, $1.620\lambda$, and means for exciting said antennae with equal currents that progressively shift in phase in going around the circle.

6. A blind landing antennae array comprising a plurality of mutually spaced vertical antennae arranged in a circle of a radius equal to $.610\lambda$, $1.116\lambda$, $1.616\lambda$, or $2.120\lambda$, together with another vertical antenna that is disposed at the center of the circle, and means for exciting said plurality of antennae with equal currents in the same phase and said central antennae in the same or opposite phase to that of the plurality of antennae.

WILLIAM W. HANSEN.